(12) United States Patent
Kousha et al.

(10) Patent No.: US 10,747,714 B2
(45) Date of Patent: Aug. 18, 2020

(54) SCALABLE DISTRIBUTED DATA STORE

(71) Applicant: International Business Machines Corporation, Armonk, NY (US)

(72) Inventors: Keyan Kousha, Emeryville, CA (US); Michelle C. Munson, Berkeley, CA (US); Serban Simu, Berkeley, CA (US); Ying Xu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/110,059

(22) Filed: Aug. 23, 2018

(65) Prior Publication Data

US 2018/0365235 A1 Dec. 20, 2018

Related U.S. Application Data

(63) Continuation of application No. 14/983,912, filed on Dec. 30, 2015, now Pat. No. 10,089,307.

(60) Provisional application No. 62/098,482, filed on Dec. 31, 2014.

(51) Int. Cl.
| | |
|---|---|
| *G06F 11/00* | (2006.01) |
| *G06F 16/00* | (2019.01) |
| *G06F 11/20* | (2006.01) |
| *G06F 16/27* | (2019.01) |
| *G06F 16/182* | (2019.01) |
| *G06F 16/25* | (2019.01) |
| *G06F 11/07* | (2006.01) |

(52) U.S. Cl.
CPC .......... *G06F 16/00* (2019.01); *G06F 11/2023* (2013.01); *G06F 11/2097* (2013.01); *G06F 16/182* (2019.01); *G06F 16/256* (2019.01); *G06F 16/27* (2019.01); *G06F 11/0757* (2013.01); *G06F 2201/80* (2013.01)

(58) Field of Classification Search
CPC ...... G06F 9/505; G06F 9/5077; G06F 9/5083; G06F 9/5088; G06F 16/184; G06F 16/21; G06F 16/182; G06F 16/278
See application file for complete search history.

(56) References Cited

U.S. PATENT DOCUMENTS

| | | | | |
|---|---|---|---|---|
| 5,423,037 | A * | 6/1995 | Hvasshovd | ......... G06F 11/1482 |
| 5,687,369 | A * | 11/1997 | Li | ........................... G06F 16/27 |
| 6,044,367 | A | 3/2000 | Wolff | |
| 6,173,377 | B1 | 1/2001 | Yanai | |
| 6,654,862 | B2 | 11/2003 | Morris | |

(Continued)

OTHER PUBLICATIONS

Wybranietz, "Monitoring and Performance Measuring Distributed Systems During Operation" 1988, ACM, University of Laierslautern, pp. 1-10.

(Continued)

*Primary Examiner* — Bryce P Bonzo
*Assistant Examiner* — Jeison C Arcos
(74) *Attorney, Agent, or Firm* — Jay Wahlquist; Edell, Shapiro & Finnan, LLC

(57) ABSTRACT

Described is a framework that manages a clustered, distributed NoSQL data store across multiple server nodes. The framework may include daemons running on every server node, providing auto-sharding and unified data service such that user data can be stored and retrieved consistently from any node. The framework may further provide capabilities such as automatic fail-over and dynamic capacity scaling.

15 Claims, 8 Drawing Sheets

(56) References Cited

U.S. PATENT DOCUMENTS

| | | | |
|---|---|---|---|
| 7,206,836 B2* | 4/2007 | Dinker | G06F 11/2069 709/214 |
| 7,747,414 B2 | 6/2010 | Armstead | |
| 8,051,017 B2 | 11/2011 | Munson et al. | |
| 8,085,781 B2 | 12/2011 | Munson et al. | |
| 8,214,707 B2 | 7/2012 | Munson et al. | |
| 8,583,977 B2 | 11/2013 | Munson et al. | |
| 8,645,750 B2 | 2/2014 | Kaneko | |
| 8,719,443 B2 | 5/2014 | Xu et al. | |
| 8,909,560 B2 | 12/2014 | Munson et al. | |
| 8,996,945 B2 | 3/2015 | Munson et al. | |
| 9,122,588 B1 | 9/2015 | Mondal | |
| 9,276,865 B2 | 3/2016 | Xu et al. | |
| 9,569,459 B1* | 2/2017 | Strauss | G06F 16/182 |
| 2003/0014503 A1 | 1/2003 | Legout et al. | |
| 2003/0079156 A1 | 4/2003 | Sicola | |
| 2003/0158869 A1 | 8/2003 | Micka | |
| 2003/0221074 A1 | 11/2003 | Satoyama | |
| 2004/0049572 A1 | 3/2004 | Yamamoto | |
| 2004/0103261 A1 | 5/2004 | Honda | |
| 2004/0107315 A1 | 6/2004 | Watanabe | |
| 2005/0066128 A1 | 3/2005 | Yagisawa | |
| 2005/0120160 A1* | 6/2005 | Plouffe | G06F 9/45537 711/1 |
| 2006/0031594 A1 | 2/2006 | Kodama | |
| 2006/0095700 A1* | 5/2006 | Sato | G06F 3/0605 711/165 |
| 2006/0101214 A1 | 5/2006 | Mikami | |
| 2006/0129608 A1 | 6/2006 | Sato | |
| 2006/0136633 A1 | 6/2006 | Harima | |
| 2006/0150001 A1 | 7/2006 | Eguchi | |
| 2006/0159098 A1 | 7/2006 | Munson et al. | |
| 2006/0277445 A1 | 12/2006 | Kano | |
| 2007/0162506 A1* | 7/2007 | Grosman | G06F 16/278 |
| 2007/0162717 A1 | 7/2007 | Mikami | |
| 2007/0255920 A1 | 11/2007 | Gold | |
| 2008/0046400 A1* | 2/2008 | Shi | H04L 67/1008 |
| 2008/0071499 A1 | 3/2008 | Armstead | |
| 2008/0104346 A1 | 5/2008 | Watanabe | |
| 2008/0104443 A1 | 5/2008 | Akutsu | |
| 2008/0126842 A1 | 5/2008 | Jacobson | |
| 2008/0178185 A1 | 7/2008 | Okada | |
| 2008/0263393 A1 | 10/2008 | Shirogane | |
| 2009/0006920 A1 | 1/2009 | Munson et al. | |
| 2009/0037442 A1* | 2/2009 | Yuan | G06F 16/27 |
| 2009/0037553 A1* | 2/2009 | Yuan | G06F 16/27 709/209 |
| 2009/0063698 A1 | 3/2009 | Xu et al. | |
| 2009/0276271 A1 | 11/2009 | Munson et al. | |
| 2010/0106907 A1 | 4/2010 | Noguchi | |
| 2010/0114826 A1* | 5/2010 | Voutilainen | G06F 11/1425 707/638 |
| 2010/0228878 A1 | 9/2010 | Xu et al. | |
| 2012/0047093 A1 | 2/2012 | Munson et al. | |
| 2012/0131093 A1* | 5/2012 | Hannano; Yasuo | G06F 9/5088 709/203 |
| 2012/0136835 A1* | 5/2012 | Kosuru | G06F 11/2094 707/654 |
| 2012/0166390 A1* | 6/2012 | Merriman | G06F 11/1458 707/613 |
| 2012/0254175 A1* | 10/2012 | Horowitz | G06F 16/278 707/737 |
| 2012/0272115 A1 | 10/2012 | Munson et al. | |
| 2012/0320732 A1 | 12/2012 | Simu et al. | |
| 2013/0254590 A1* | 9/2013 | Chercoles Sanchez | G06F 11/2094 714/6.1 |
| 2013/0290249 A1* | 10/2013 | Merriman | G06F 16/273 707/610 |
| 2014/0181610 A1 | 6/2014 | Munson et al. | |
| 2014/0211627 A1 | 7/2014 | Xu et al. | |
| 2016/0188426 A1* | 6/2016 | Kousha | G06F 16/00 714/4.12 |
| 2018/0121474 A1* | 5/2018 | Lee | G06F 16/27 |

OTHER PUBLICATIONS

List of IBM Patents or Patent Applications Treated as Related, Aug. 2018, 1 page.

\* cited by examiner

SCALABLE DISTRIBUTED DATA STORE

CROSS-REFERENCE TO RELATED APPLICATIONS

This application is a Continuation of U.S. patent application Ser. No. 14/983,912 entitled, "Scalable Distributed Data Store", and filed Dec. 30, 2015, which claims priority to U.S. Provisional Patent Application Ser. No. 62/098,482, entitled "Scalable and Distributed Data Store", and filed Dec. 31, 2014, the disclosures of which are incorporated herein by reference in their entireties.

BACKGROUND

1. Technical Field

Present invention embodiments relate to databases, and more specifically, to distributed databases and methods for their operation.

2. Discussion of the Related Art

The emergence and popularity of in-memory NoSQL databases (often interpreted as "not only SQL" where SQL refers to structured query language) can be attributed to the flexible data model and the huge performance gain they provide as compared with a traditional relational database management system (RDBMS). In particular, NoSQL databases adopt flexible, schema-less data models which eases application usage and fits well to the need of many applications. In addition, by relaxing the stringent ACID (Atomicity, Consistency, Isolation, Durability) properties required by traditional RDBMS, NoSQL databases in general have less sophisticated design architecture which yields much greater performance as the database (DB) scales out. As a result, open-source and proprietary NoSQL data stores such as Memcached, Redis, Voldemort, MongoDB and Couchbase have gained huge grounds in terms of market adoption in recent years.

SUMMARY

According to one embodiment of the present invention, a plurality of DB nodes is provided, each DB node including a processor, memory, storage medium, and a network interface for communicating over a communication network. One or more distributed DBs are hosted by the plurality of DB nodes, each of the one or more distributed DBs including a plurality of DB partitions. Each DB partition is a process executed by a processor of a particular DB node representing either a master DB partition or a slave DB partition. The master DB partition is configured to accept data requests and the slave DB partition is configured to synchronize with the master DB partition. At least one daemon process is executed by at least one processor of at least one of the plurality of DB nodes. The at least one daemon process accepts data requests and determines which DB partition serves the request. Upon a failure of a DB node of the plurality of DB nodes, the at least one daemon process promotes at least one first slave DB partition that is hosted by a non-failed DB node to at least one first master DB partition. The at least one first slave DB partition corresponds to at least one second master DB partition hosted by the failed DB node.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled. It is understood that variations in configurations and combinations of components may be employed without departing from the scope of the present subject matter. The examples set forth herein are intended to be demonstrative and not a limiting or exhaustive depiction of variations.

One challenge when it comes to storing vast amounts of data in a NoSQL DB is managing a cluster of DB nodes automatically. Present invention embodiments provide methods and systems to manage distributed data across a cluster of DB nodes, with capabilities such as automatic fail-over and dynamic capacity scaling. These clusters of DB nodes represent a scaled or scaleDB framework that is capable of handling significant amounts of data.

The scaleDB framework may be implemented in-memory on top of a key-value store server, i.e., a data structure server. An in-memory database framework or database management system is stored in and relies on the main memory of a computer system. Main memory or in-memory databases are generally faster than disk-optimized databases since the internal optimization algorithms may be much simpler and require fewer CPU instructions.

An example of an in-memory data structure server is the open source Redis server. It should be appreciated that while an implementation of the scaleDB framework may be based on a Redis server, the design components of the scaleDB framework are not limited to Redis itself and can be applied to any kind of NoSQL storage engine.

Figure 1:
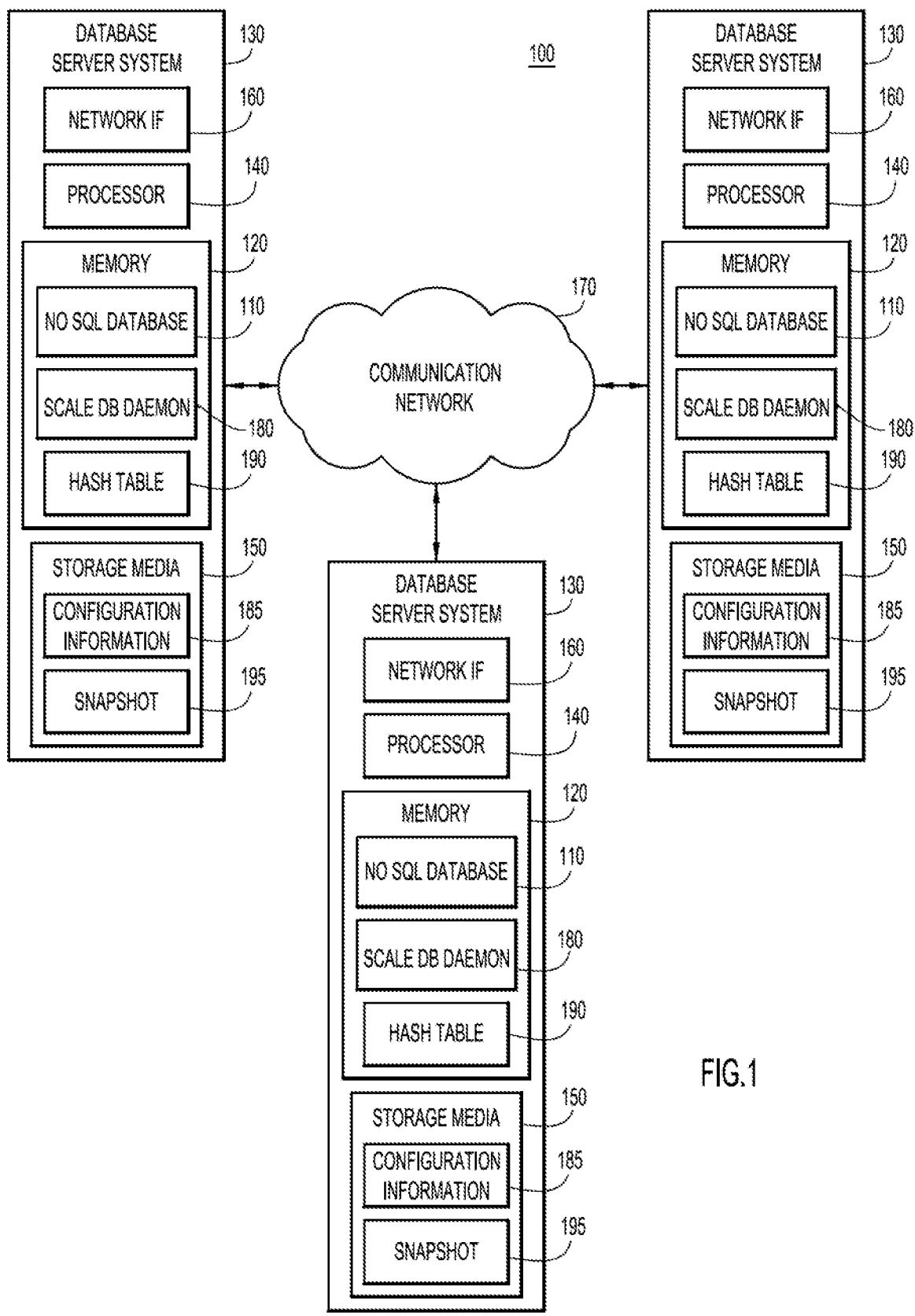
FIG. 1 is a diagrammatic illustration of an example computing environment for use with an example embodiment of the present invention.

An example computing environment for use with present invention embodiments is illustrated in FIG. 1. As shown in FIG. 1, the scaleDB framework 100 includes a plurality of NoSQL databases 110 stored in main memories 120 hosted by a cluster of database server systems (nodes) 130. Each of the database server systems 130 includes a processor 140, a storage media (e.g., hard disks) 150 and networking interfaces 160 to communicate over a communication network 170. As shown in FIG. 1, configuration information 185 is stored in storage media 150. However, instead of being stored in storage media 150, configuration information 185 may also be stored in memory 120. In addition, memories 120 contain hash tables 190 utilized by scaleDB daemons 180 for managing multiple databases.

Each database contains a vast amount of unstructured data records, and may be split into multiple disjoint subunits called DB partitions in order to fit into the storage media of a single node. A DB partition is a logical collection of data records, and may be hosted by a software (DB) process referred to as scaleDB daemon 180 stored in memories 120 of database server systems 130 and executed by processors 140. The scaleDB daemon 180 accepts data requests and determines which DB partition serves the request.

Figure 2:
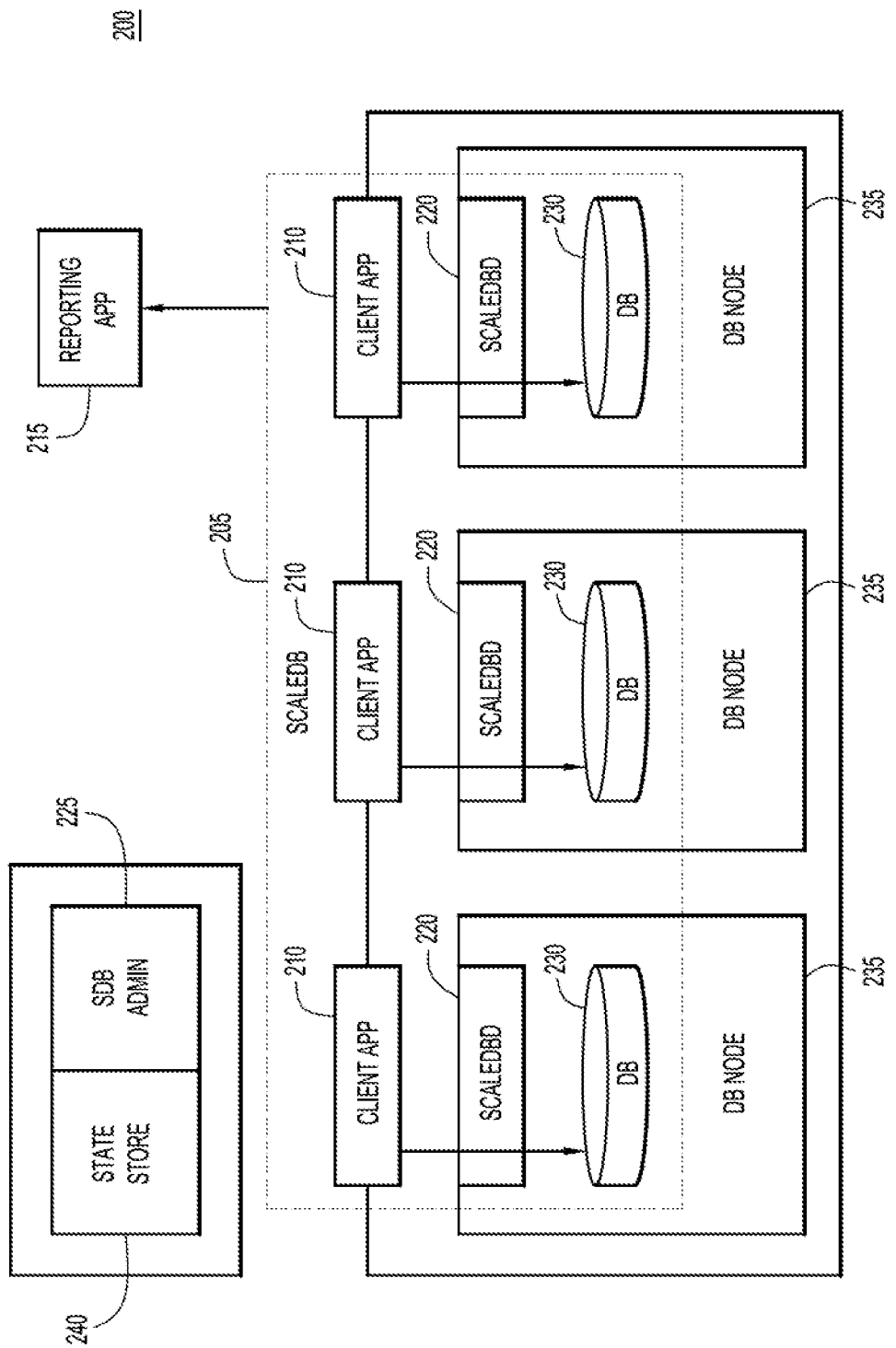
FIG. 2 is a diagrammatic illustration of architectural components of a scaled framework according to an example embodiment of the present invention.

FIG. 2 shows architectural components of scaleDB 205 in scaleDB framework 200. ScaleDB framework 200 provides a clustered, auto-scalable transfer platform that supports real-time monitoring of transfer statistics. ScaleDB 205 includes client applications 210. Client applications 210 may write vast amounts of data records associated with a transfer history into scaleDB 205. These records may be periodically pulled by reporting application 215 to display live transfer status on a user interface (UI) (not shown). As is shown in FIG. 2, the three major components in the ScaleDB architecture are: scaleDB daemon 220, scaleDB administration tool 225, and the underlying DB partitions 230 managed by scaleDB 205.

ScaleDB daemon 220 represents a clustering layer that manages underlying ScaleDB instances and hosts a common data service application program interface (API) to client applications 210 via a single Transmission Control Protocol (TCP) port (not shown).

As shown in FIG. 2, scaleDB framework 200 includes DB nodes 235 that correspond to database server systems 130 in FIG. 1. The architecture of scaleDB framework 200 is not limited to separate physical database server systems. Instead, database server systems 130 may also be implemented as virtual server systems on a single physical database server.

ScaleDB daemons 220 may be deployed on every DB or cluster node 235, through which client applications 210 are able to access important DB data. Each scaleDB daemon 220 maintains a uniform set of configuration information 185 (shown in FIG. 1) and used to power up the common data service.

ScaleDB daemon 220 is capable of managing multiple databases. Each database is a logical collection of data that can be spread across all DB nodes 235. Like some other clustered DB technologies, as discussed above, ScaleDB daemon 220 divides all the data stored in one logical database into multiple smaller, disjoint data units, defined as DB partitions 230. Each DB partition 230 represents a fraction of the logical database. A DB partition 230 is managed by the scaleDB daemon 220 running on the same DB server node 235.

Figure 3:
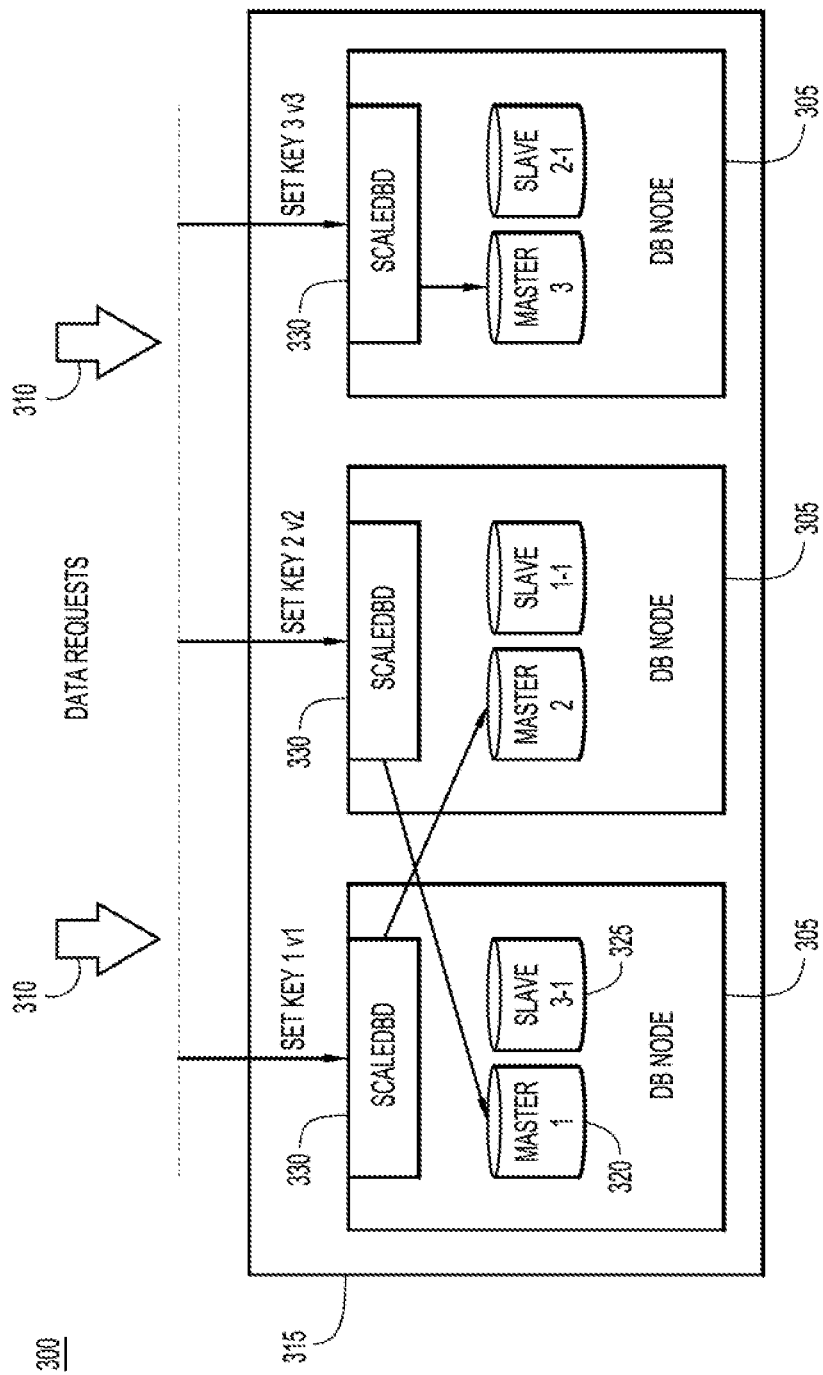
FIG. 3 is a diagrammatic illustration of a plurality of data requests according to an example embodiment of the present invention.

Each DB partition 230 is assigned with a role of master or slave such as master partition 320 and slave partition 325 depicted in FIG. 3. Both master and slave partitions are software programs (daemons) running on a particular DB server node 235. A master DB partition accepts data requests and a slave DB partition synchronizes with the master node. As discussed in more detail below, this setup facilitates recovering from a master node failure.

The internal mapping between ScaleDB, master DB partition, and slave DB partition may follow a tree-like structure, indexed by IDs at each level. In one example embodiment, each scaledb daemon 220 maintains a hash table 190 of DBs, each of which is indexed based on a unique DB ID. For each ScaleDB 205, the number of master partitions is maintained similarly based on a mapping between PartitionID and a logical master partition. The PartitionID is defined as a 32-bit integer, which allows for over a billion partitions within a logical database. The first master partition starts from PartitionID equal to 0, the second from 1, and so on. Each master partition again hosts a number of slave DB partitions, identified by the Slave ID. Slave partition 1 for example starts with slave ID equal to 1; slave partition 2 starts with slave ID equal to or greater than 2, and so on. The slave ID of the master partition is set to 0.

In addition to database states, as discussed above, a scaleDB cluster includes a number of DB nodes 235 (or servers). These DB nodes 235 may be running instances hosting DB partitions 230 and, as also discussed above, may represent either physical machines or virtual machines. In one example embodiment, similar to DB partitions 230, each database server system is identified by a unique server ID, again in the form of a 32-bit integers starting from 1. In addition, each server can also be identified based on its Internet protocol (IP) address and a customized "name".

The algorithm below shows both DB states and the server (DB node) states according to an example embodiment, which compose the entire set of internal states maintained by each scaleDB daemon 220.

---
<DBID1 → DB1>
...
<DBIDn → DBn>
---
DB 1:
<0 → MasterDBPartition 1>
<1 → MasterDBPartition 2>
...
<(n−1) → MasterDBPartition n>
---
MasterDBPartition 1:
<SlaveID1 → SlaveDBPartition1>
<SlaveID2 → SlaveDBPartition2>
...
<SlaveIDn → SlaveDBPartition1>
MasterDBPartition 2:
...
MasterDBPartition (n−1):
...
---
<SID1 → Server1>
...
<SIDn → Servern>
---

As shown in the algorithm above, the set of DB states follows a tree structure in which each level is similar to a hash table, with ID hashed to the corresponding object. The set of servers also follows the structure of a hash table, with SID hashed to each individual server object.

A uniform set of internal states regarding ScaleDB, master and slave DB partitions may be maintained at each scaledb daemon 180 in the form of hash table 190 shown in FIG. 1. In order for scaleDB 205 to function properly, this set of states needs to be synchronized among all scaleDB daemons 220. The scaledb design does not restrict which mechanism to be used to keep the daemons running on different DB nodes 235 synchronized (with regard to a uniform set of internal states). For example, in one implementation, a centralized state store 240 deployed on one of the cluster or DB nodes 235 is used to host the "most accurate" version of the states. Scaledb daemons 220 load these internal states upon booting up. In addition, scaleDB daemons 220 may have these states updated upon detection of specialized commands inside the state store 240.

Configuration information 185 may be stored in state store 240. When each scaleDB daemon 220 starts, the scaleDB daemon 220 loads all configuration information 185 relevant to database server systems 130 and DBs 205 from state store 240. Each scaleDB daemon 220 applies the same algorithm to assign various DB partitions 230 across the set of database server systems 130. In one example embodiment, an intuitive round-robin algorithm is used to enforce the following criterion as much as possible: 1) no two different master partitions may reside on the same server, and 2) no master partition and its slaves may reside on the same server.

```
SID = 0
FOREACH master DB partition (m_partition)
    SID = SID + 1
    IF (SID > # of servers)
        SID = 1
    ASSIGN(m_partition, SID)
    SID1 = SID
    FOREACH m_partition's slave DB partitions
    (s_partition)
        SID1 = SID1 + 1
        IF (SID1 > # of servers)
            SID1 = 1
        ASSIGN(s_partition, SID1)
```

It is easy to observe that as long as the number of master partitions is less than or equal to the number of database server systems 130, criterion 1 can always be satisfied. As long as the number of slave partitions is less than the number of database server systems 130, criterion 2 can always hold.

FIG. 3 shows scaleDB framework 300 which includes DB nodes 305 that correspond to database server systems 130 in FIG. 1 and DB nodes 235 in FIG. 2. The scaleDB data service of scaleDB framework 300 depicted in FIG. 3 adopts a key-value data model where records are identified via a unique key. As shown in FIG. 3, a plurality of data requests 310 are received by scaleDB 315. Each value object of the requests 310 can take a variety of forms ranging from a simple string, lists, hashes, to even documents and a simple set of DB requests 310 may be represented key-string operations. The following is an example of a key-string operation:

string=Get(key)
Set(key, string)
Del(key)

One design challenge is how to split the vast amount of data records among existing DB partitions in an automatic way, i.e., auto-sharding. In the example embodiment depicted in FIG. 3, all data records contain a unique key string which is used to determine which partition the data record is assigned to. The general form of this problem can be formulated as follows:

PartitionID pid=Dispatch(key)

For a given incoming request 310, the key is extracted from the request and serves as the input to a dispatching algorithm, which maps the key to a particular PartitionID. Various mapping functions can be used, ranging from simple random function, modulo function and generic hashing function. In the example embodiment depicted in FIG. 3, scaleDB 315 uses a design that resembles a consistency hashing (CH) mechanism. This mechanism minimizes the number of keys that need to be changed when DB nodes 305 are added or removed. The design of scaleDB 315 focuses on providing an auto-sharding mechanism in general, and is flexible regarding what specific auto-sharding mechanism is used.

FIG. 3 further shows scaleDB daemons 330. All scaleDB daemons 330 may adopt the auto-sharding mechanism (for consistency hashing, i.e., the same hashing algorithm), which yields the same result for the same key. As a result, any scaleDB daemon 330 processing a given request 310 can always locate the exact DB partition 305 where the record is hosted. In other words, data can be reliably retrieved from any DB node 305 where the data service runs.

Most distributed data services represent a trade-off between consistency, availability and partition tolerance. According to an aspect of the present invention, consistency is the first criterion to be met. To guarantee strong consistency, all read and write operations are performed against the master partition, e.g., master partition 320 in FIG. 3. Replica partitions such as slave partition 325 mainly serve as redundant backups, but not for load balancing purposes. If one master partition (e.g., master partition 320) is unavailable, part of the data service is unavailable as well. To mitigate this issue, an automatic fail-over mechanism is introduced to increase the availability of the overall system.

Another abnormal scenario is partition isolation, i.e., when communications between partitions are cut off. Since no replicas or slave partitions serve as data access points, during partition isolation the data service can continue to operate, even if slave partitions lag behind the master partition.

In addition, it should be appreciated that the operation of the cluster, e.g., scaleDB 315 is independent from the existence of centralized components, e.g., state store 240 depicted in FIG. 2. The unavailability of state store 240 only renders the cluster (e.g., scaleDB 315) stay running with a static configuration, e.g., without any capability of scaling up and down. The scaleDB cluster 315, however, is able to continue to serve data requests.

According to an example embodiment of the present invention, scaleDB partitions such as master partition 320 and slave partition 325 have the capability to periodically dump snapshots 195 onto the persistent storage, e.g., storage media 150 depicted in FIG. 1. With a cron based service that periodically collects and stores snapshots 195 to storage media 150, it is possible to build a platform that gathers long term historical statistics. According to an aspect of the present invention, this feature can be enabled or disabled.

Another important functionality provided by scaleDB daemon 330 is monitoring the health of the DB partitions (e.g. master partition 320 and slave partition 325 in FIG. 3) it manages. This capability may be provided through a process management library written in programming language C. The scaleDB daemon 330 periodically checks if the DB partitions 320 and 325 are still running. In case one or more DB partitions crashed or are not operational, the scaleDB daemon 330 tries to restart DB partitions 320 and 325 to get back to the original configuration.

Figure 4:
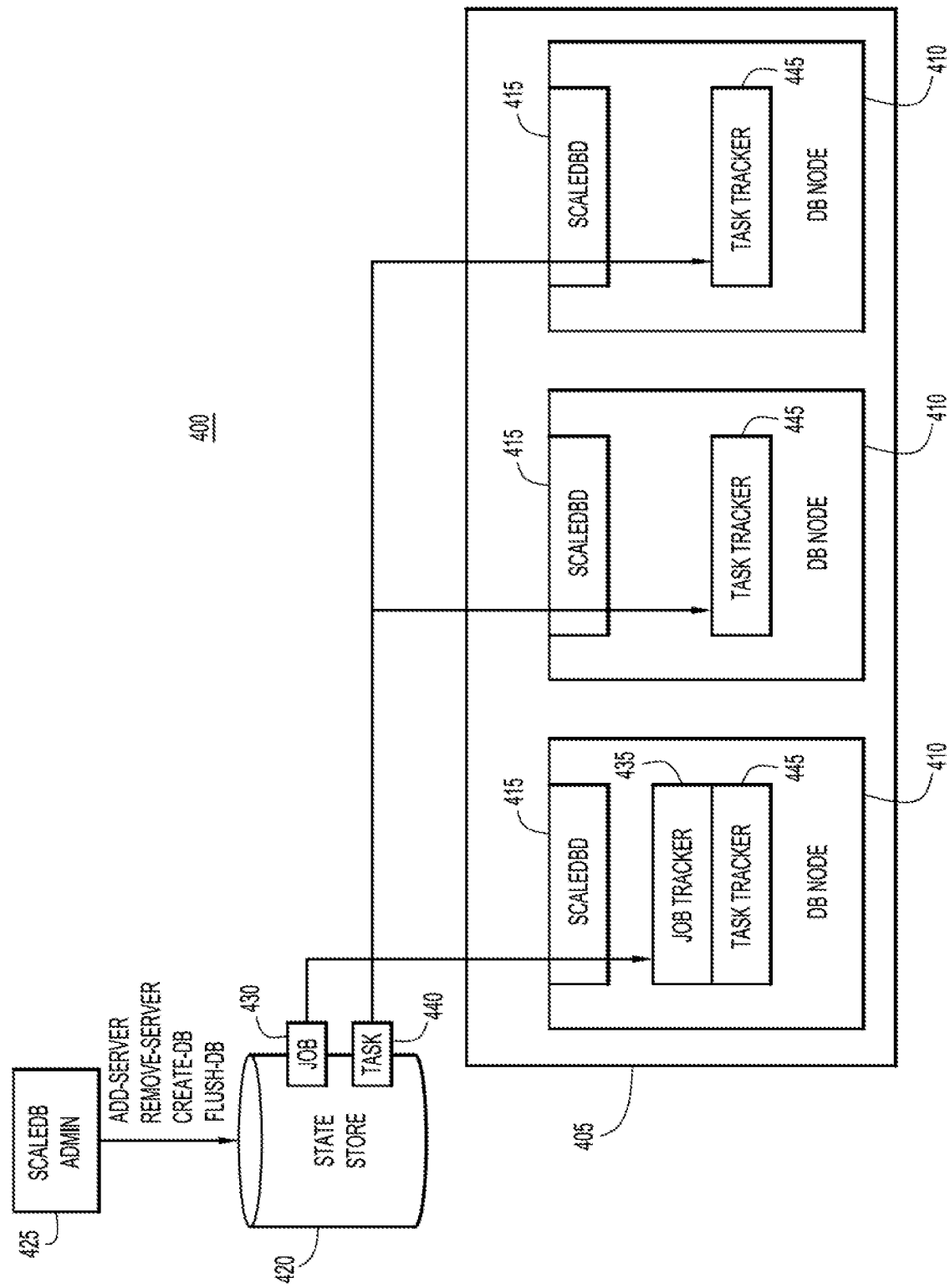
FIG. 4 is a diagrammatic illustration of a cluster-wide job control according to an example embodiment of the present invention.

Reference is now made to FIG. 4 (with continued reference to FIGS. 1-3). FIG. 4 shows scaleDB framework 400 which includes scaleDB 405. ScaleDB 405 includes DB nodes 410. Each DB node 410 has a scaleDB daemon 415. For sake of failure recovery and job execution, all scaleDB daemons 415 may periodically attempt to acquire a master lock positioned inside the state store 420. A minimal lock implementation only requires two fields: the "master UUID" field and the "locked_at" timestamp. The first field identifies the current owner of the lock, and the second fields identifies when the lock was updated.

```
{
    locked_by: master_uuid
    locked_at: timestamp
}
```

A lock acquisition algorithm is provided that periodically examines the above JSON structure (short version), and determines if the lock can be acquired based on the lock properties:

```
now = GetCurrentTime( )
IF (now – locked_at > expired) {
    // acquire an expired lock
    locked_by = daemon UUID
    locked_at = now
} ELSE IF (master_uuid == daemon UUID) {
    // I am master
    locked_at = now
} ELSE {
    // master exists, do nothing
}
```

The existing master daemon periodically updates the lock (e.g., every second). In case a master partition (e.g., master partition 320 in FIG. 3) becomes inoperable, the lock eventually expires. The first scaleDB daemon 415 which senses the lock expiration grabs the lock with its own UUID as the new master UUID and becomes the new master.

Similar to other conditional-update algorithms, the sequence of operation is executed via a scripting interface (not shown) provided by the state store 420 such that the operations are running within a transactional envelope. For example, when Redis is used as the state store, Lua scripting is employed to provide such transaction support.

As discussed with regard to FIG. 3, the scaleDB daemons 330 provide data services that serve client DB data requests 310. Additionally, as shown in FIG. 4, a scaleDB cluster is equipped with an administrator tool which provides cluster-wide control and management functionalities. The scaleDB administrator tool 425 may be either deployed on a centralized location such as the server hosting the state store (not shown). Alternatively, the scaleDB administrator tool 425 may be provisioned on every server node.

The administration function provided by the scaleDB administrator tool 425 may cover the following aspects:
Flush scaledb
Start/Stop/Restart scaledb data service
Start/Stop/Restart scaledb data service and partitions
Add/Remove scaledb nodes
Enable/Disable scaledb nodes
Add/Remove scaledb partitions
Replace failed node with new node The above set of administration functions are implemented as "commands", or "jobs", which are issued from the scaleDB administrator tool 425 to each scaleDB daemon 415, via state store 420. This ensures that all scaleDB daemons 415 (indirectly) collaborate with each other to fulfill cluster-wide actions. Critical scaleDB administration functions are listed in Table 1.

TABLE 1

Critical scaledb scaleDB administration functions.

| Command | Description |
| --- | --- |
| db_create | create a scaleDB with given number of partitions and replicas |
| db_remove | remove the DB with a given name |
| db_start | start all scaledb partitions on all db nodes |
| db_stop | stop all scaledb partitions on all db nodes |
| node_add | add a new node (server) to the scaledb cluster |
| node_remove | remove a given node (server) from the scaledb cluster |
| node_recover | recover a server with a given name (execute fail-over procedure) |
| node_replace | replace a given node with a new node that was just spun up |
| partition_add | add a new DB partition to an existing scaledb |
| partition_remove | remove a DB partition of an existing scaledb given a particular PartitionID |
| Fix | fix any errors encounter in the process of partition_add and partition_remove |

Each DB instance stores the actual data records. The design of ScaleDB 405 is orthogonal to the type of underlying DB instance used. The ScaleDB is designed to be utilized with non-transactional NoSQL databases such as key-value stores and document stores. According to an example embodiment, scaleDB 405 is implemented on top of a Redis server. In such an implementation, each master or slave DB partition (e.g., master partition 320 and slave partition 325 in FIG. 3) represents a running Redis daemon.

To support auto-sharding across multiple Redis instances, the implementation also integrates an open-source Redis proxy server (not shown) which provides data proxying service between Redis clients and multiple Redis servers. The auto-sharding capability, however, as an integral part of the distributed data store (scaleDB) design, and the exact sharding mechanism may vary.

Returning now to FIG. 4. ScaleDB life cycle management includes start/stop/flush the entire scaleDB 405. Since scaleDB 405 consists of multiple data partitions residing on different DB nodes 410, cluster-wide "jobs" or "commands" involve coordination between the scaleDB administrator tool 425 and the scaleDB daemons 415. In the scaledb design shown in FIG. 4, this kind of coordination is achieved by virtue of a "job" execution framework.

Upon issuance of every job 430, the scaleDB administrator tool 425 creates a new job description entry in state store 420. The master scaleDB daemon 415 constantly pulls the centralized state store 420, and parses any new job 430 detected in the "job queue" (not shown). A master scaleDB daemon maintains a job tracker 435 which tracks the overall progress of all active jobs 430. The job tracker 435 decomposes a new job 430 into a series of tasks 440 placed by the master daemon into state store 420. The set of tasks 440 are picked up one by one by the task tracker 445 of every scaleDB daemon 415 (including the master).

Both tasks 440 and jobs 430 may be executed back-to-back in a sequential order. In other words, one task only starts to execute until the previous task completed successfully. Similarly, one job only starts to execute until the previous job completed successfully. Task serializability is enforced by job tracker 435 on the master scaleDB daemon. Specifically, after decomposing a job 430 into a series of tasks 440, job tracker 435 puts the first task inside a "task queue" (not shown) in state store 420, and listens to the acknowledgements sent by the individual task trackers 445. If all scaleDB daemons 415 send a positive acknowledgement, the task is marked completed and the job tracker 435 updates the task queue with the next task. Otherwise the task fails which triggers the entire job to fail. Job-level serializability is enforced by the scaleDB administrator tool 425. If a job 430 completes successfully, the job tracker 435 places a positive acknowledgement inside the state store 420. In this case, the scaleDB administrator tool 435 updates the job queue with the next job (if available). Upon a job failure, the scaleDB administrator tool 435 outputs errors and return immediately.

The state store 420 in the above example embodiment is a centralized component. Although this centralized component implies maximal controllability and simplifies the implementation, the scalable distributed data store is not limited to a centralized design. Instead, in another example embodiment, the states stored in the centralized state store 420 may be distributed to each DB node 410, and kept consistent via a distributed synchronization framework such as Apache Zookeeper. Such a design makes the job execution framework fully distributed.

ScaleDB 405 may include a built-in fail-over mechanism based on a master-slave replication mechanism offered by an underlying DB instance layer. The built-in fail-over mechanism may include three different phases.

(1) Failure Model and Detection Mechanism

Within the entire fail-over mechanism, the failure detection mechanism is one loosely coupled component. The current fail-over mechanism covers detection and recovering failed scaleDB nodes 410 including failed scaleDB daemons 415. In such scenarios, part or all of the scaleDB data service is unavailable hence fail-over actions need to start right away. For simplicity, it is assumed that the centralized state store 430 is available during the entire fail-over time period. In addition, it is assumed that communications between each scaleDB daemon 415 and the scaleDB administrator tool 425 are continuously available.

Each scaleDB daemon 415 periodically sends a heartbeat message reporting its health status to the scaleDB administrator tool 425. The scaleDB administrator tool 425 collects a list of healthy daemons and compares it with a list of daemons stored in the state store 420. A particular scaleDB daemon 415 that has not been heard for an extended period of time is marked as "DOWN". Upon detection of one or more "DOWN" nodes, a recovery process 500 is carried out, which is described with reference to FIG. 5.

(2) Recover Master Partitions

The main purpose of the recovery process 500 is to reenact the master partitions running on a failed node (server).

```
FOREACH node in {failed nodes}
    FOREACH master partition (m_partition) running on node
        Locate one of m_partition's slaves (s_partition)
        Demote m_partition to slave
        Promote s_partition to new master
```

The promotion/demotion of DB partitions is carried out via a cluster-wide job. A specific "promote" job is pushed into the state store 420, and picked up at each running scaleDB daemon 415. In the case of Redis DB partitions, this involves issuing a "SLAVEOF NO ONE" command on the newly promoted DB partition, and a "SLAVEOF $master_host $master_port" (host and IP address of "s_partition" given above) at every other running DB partition.

After the failure recovery procedure is completed, all master partitions are hosted on the remaining set of server nodes and the data service is able to continue running. The failure recovery process 500 does not restore failed slave partitions, since they do not offer (read/write) data service like a master partition does. Hence the cluster can offer complete data service even if a few slave partitions are inoperable.

(3) Replace Failed Nodes and (Optional) Rebalance

As a last step in the recovery process, new nodes are always created to replace the failed nodes. To replace a failed node, a "NODE_REPLACE" command is issued by the scaleDB administrator tool 425 which triggers the new node to inherit all DB partitions residing on the node to be replaced. A "DB_RESTART" command is then sent to all scaleDB daemons, which causes each scaleDB daemon to restart and pick up the updated configurations.

All DB partitions inherited by the replacement nodes are slave partitions, since the recovery process demotes all partitions on the failed nodes to slaves. As a result, there exists a load imbalance when it comes to the number of master partitions per node. Hence, a "rebalancing" procedure is introduced, which essentially re-distributes all the master partitions evenly across all the existing server nodes.

Figure 5:
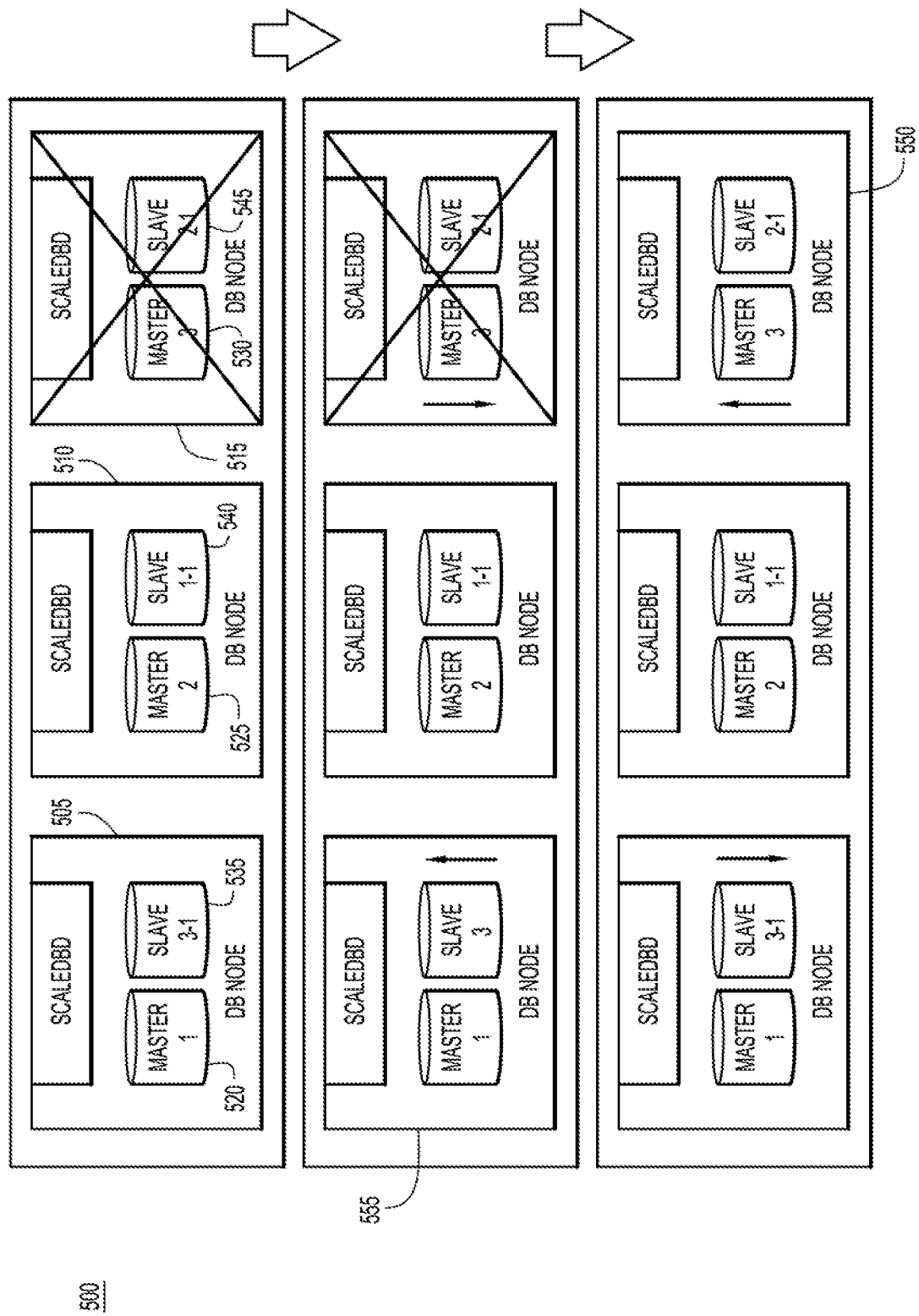
FIG. 5 is a diagrammatic illustration of a recovery process upon detection of a single-node failure in a group of nodes according to an example embodiment of the present invention.

FIG. 5 shows an example of the recovery process 500 upon detection of a single-node failure in group of nodes 505, 510 and 515. Specifically, there are three master partitions 520, 525 and 530, each having one slave partition 535, 540 and 545, and node 515 is assumed to fail at some point in time. During the recovery process 500, the slave of master 3 (530), i.e., slave 3-1 (535), which is located on node 505, is promoted to a new master node, while the old master is demoted into a slave node. The data service continues to run with three master partitions hosted by two remaining nodes 505 and 510. After a new node is spun up, it becomes the new node 550 (replacing old node 515). Finally, by virtue of the re-balancing procedure, the original partition distribution is restored, where each node hosting one master partition and one slave partition.

Since only the master DB partition has its data stored on persistent storage, re-distributing the master partitions cannot be achieved by simply restarting the entire DB. Instead, a specialized algorithm is designed to compare the differences between the old state and the new state after re-distribution, and achieve re-balancing largely by issuing a series of promote/demote operations on the DB partitions. The details of this algorithm are as follows:

```
Step 0: stop data service
Step 1:  Re-distribute masters and slaves to compute Snew
For each new master in Snew, if it is located on another
    node in Sold
Compare slave list in Sold and slave list in Snew, to
identify spare slave as promotee.
    Example:
    old partitions: s1-1, s1-2 new partitions: M1, s1-1
    Select s1-2 to be the spare slave to promote to master
    old partitions: s1-1, s1-3 new partitions: M1, s1-1, s1-2
    Select s1-3 to be the spare slave to promote to master
    old partitions: s1-1, new partitions: M1, s1-1
    Spawn a new slave to be the spare slave
```

-continued

```
Note: As long as 1 <= npartitions <= # of nodes, a spare
slave can always be found.
Wait till spare slave is fully synchronized with current
  master
Replication is done once the "master_sync_in_progress"
  flag turns to 0 (Redis)
Promote the spare slave to become the new master
Enslave the new master
Issue "SlaveOf" command to all relevant partitions
  (Redis)
After Step 1, all masters are re-distributed to the
  correct new location.  If Sold and Snew have the same
  number of nodes, applying Step 1 upon Sold shall make it
  equivalent to Snew .
Step 2: Save Snew  to the state store
Post-completion: Start data service
```

In the re-balancing algorithm shown above, $S_{old}$ represents an old internal state before redistribution and $S_{new}$ represents a new internal state after redistribution. Spare slaves are slave nodes belonging to the same master which do not appear in the slave list on the same node in $S_{new}$.

According to an aspect of the present invention, the cluster management is capable of expanding or shrinking the size of the cluster based on usage conditions. For example, a user may choose to double the number of DB partitions or DB nodes when detecting a spike in memory (or CPU) usage per node. It is also typical to run a DB cluster with a small number of nodes and partitions, and then to continue to scale out on both dimensions as the amount of data to be stored in the DB increases. ScaleDB may thus provide administrative operations that allow scaling up and down of the size of the DB cluster in an automatic fashion.

Figure 6:
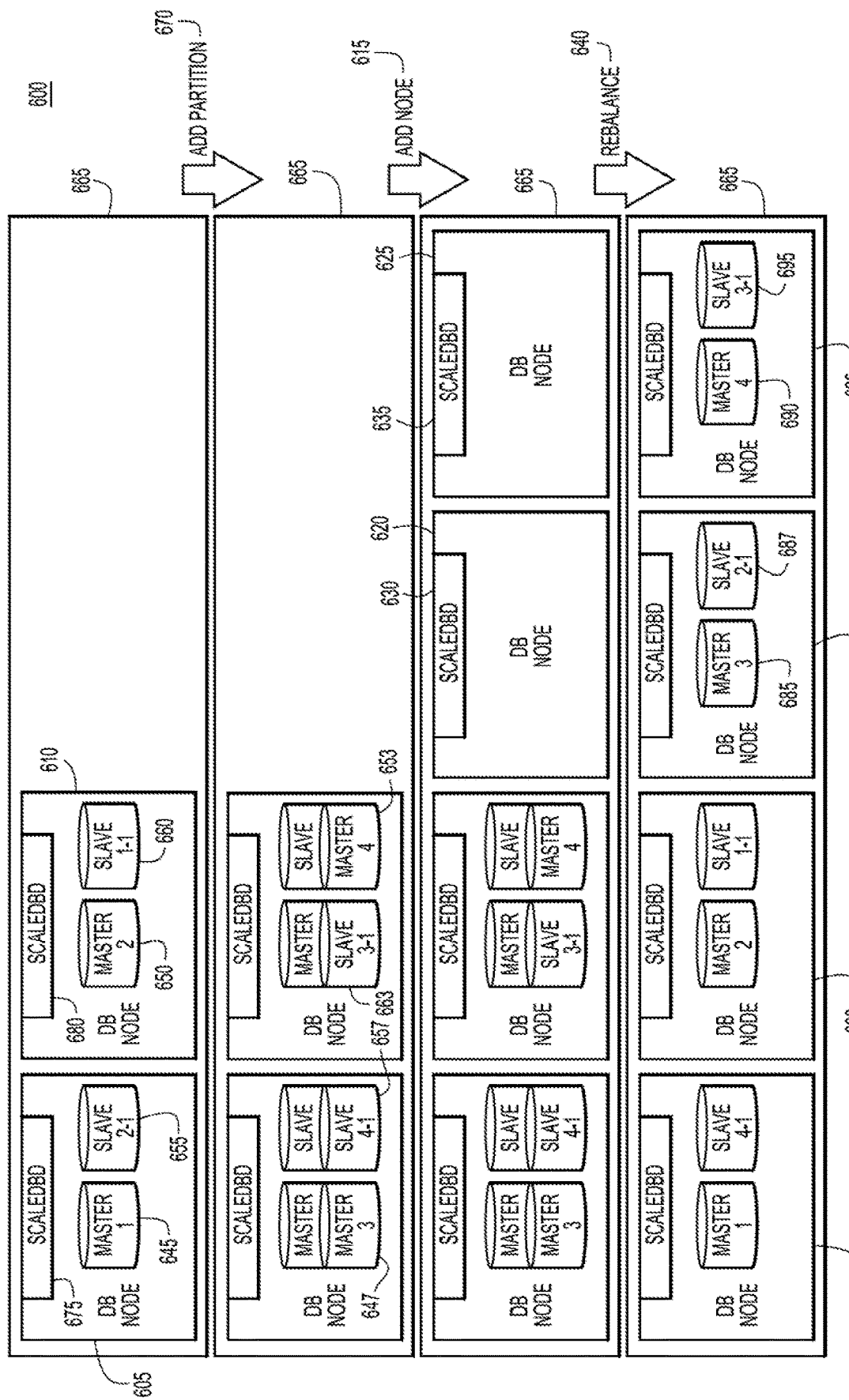
FIG. 6 is a diagrammatic illustration of combined actions of adding DB servers and DB partitions according to an example embodiment of the present invention.

FIG. 6 shows a framework 600 that includes DB nodes 605 and 610. A first administrative operation to increase the number of DB servers is illustrated in FIG. 6. The administrative operation utilizes an admin command "node_add" 615. Every newly added DB node 615 and 625 runs with a respective scaleDB daemon 630 and 635 as a new data access point, but does not host any DB partitions in the beginning. A follow-up DB rebalance operation 640 is performed to evenly distribute DB partitions across all DB nodes 605, 610, 620, and 625.

More specifically, as illustrated in FIG. 6, a two-node cluster may be formed by DB nodes 605 and 610. The two-node cluster includes two master partitions 645 and 650 and two slave partitions 655 and 660. Each DB node 605 and 610 hosts two DB partitions (one master partition and one slave partition). Executing the admin command "node_add" 615 twice creates two DB nodes 620 and 625. These new DB nodes 620 and 625 offer two additional data service access points. Executing the admin command "db_rebalance" 640 balances the partitions across all the four DB nodes 605, 610, 620 and 625 with each DB node hosting one DB partition.

It is possible to host a large scaleDB cluster utilizing the concept of "presharding" which combines both the "node_add" and "rebalance" operations offered by the scaleDB administrator tool 425 depicted in FIG. 4. In particular, the scaleDB administrator tool 425 may first create a large number of partitions on a smaller number of DB nodes, and then gradually add DB nodes into the scaleDB cluster 665, with "rebalance" operations 640.

ScaleDB may also provide operations to expand the number of partitions of a cluster 665, through an admin function "partition_add" 670. An advantage of this approach of expanding the number of partitions compared to the "pre-sharding" philosophy described above, is that there is no need to host a large number of scaleDB storage instances on a single database server system 130. As a result, unnecessary CPU processing cost is reduced that is incurred when the cluster size of cluster 665 is small.

Another implicit advantage is related to the failure rate. When hosting a large number of partitions, the probability that a single partition fails is higher than when hosting a small number of partitions. As a result, a probability that the cluster 665 may undergo repair is also higher.

Because the partitioning scheme is closely tied to how data is sharded across DB nodes 605, 610, 620 and 625, changing the number of partitions also indicates re-distributing data records (key-values) across the entire DB cluster 665. This process is referred to as "resharding". At the high-level, resharding is treated as a job distributed to all scaleDB daemons 630, 635, 675, and 680. Every scaleDB daemon 630, 635, 675, and 680 checks all keys on all DB partitions it manages, and determines if a key needs to be moved to an alternative DB partition. The actual procedure is captured in the following pseudo-code:

```
FOREACH pid in DB Partitions
  FOREACH key in pid.KEYS( )
    pid_new = dispatch(key)
    if (pid_new != pid)
      MOVE(key, pid, pid_new)
```

According to an example embodiment of the present invention, the Redis storage engine's capability to "migrate" a single key from a particular source partition to another destination partition is utilized. Specifically, the Redis MIGRATE command is used in a manner similar to the "MOVE" operation in the pseudo-code discussed above.

Because the resharding operation may be a lengthy process, the scaleDB administrator tool 425 may provide functionalities to "fix" any failures encountered during the resharding process. In case of failure when adding a DB partition, the "fix" operation checks every key and attempts to re-distribute keys according to the partitioning scheme after resharding. In case of failure when removing a DB partition, the "fix" operation attempts to re-distribute keys according to the partitioning scheme before resharding. In other words, the "partition_remove" command is re-executed after the "fix" command.

As discussed above, FIG. 6 illustrates the combined actions of adding DB nodes 620 and 625 and DB partitions 685, 687, 690, and 695 that essentially cause the size of a two-node DB cluster formed by DB nodes 605 and 610 to double in terms of both the number of nodes and number of partitions. The two-node scaleDB cluster initially has two master partitions 645, 650 and two slave partitions 655, 660. The scaleDB administrator tool 425 (shown in FIG. 4) first issues the "partition_add" command 670 twice, such that two new master partitions 647, 653 and two new slave partitions 657, 663 are created. The four master partitions 645, 647, 650, and 653 and the associated four slave partitions 655, 657, 660, and 663 are evenly distributed across the two DB nodes 605 and 610. In a second phase of the expansion, the scaleDB administrator tool 425 issues two additional "node_add" commands 615 which create the two new DB nodes 620 and 625 that are added into the cluster configuration. As shown in FIG. 6, the new DB nodes 620 and 625 do not host any DB partitions right after being added, and there exists an imbalance in terms of partition distribution at this point in time. To correct this imbalance, in a last phase a "rebalance" command is issued by the scaleDB administrator tool 425, such that all partitions are re-distributed. As a result, as shown in FIG. 6, each DB node hosts one master partition and one slave partition after the rebalancing.

It has been determined that the ScaleDB scales out in both capacity and throughput as the number of DB nodes in the DB cluster increases. Each new node in the DB cluster contributes more memory and disk space to the scaleDB framework, which directly increases the total capacity of the scaleDB. An increase in the throughput is mainly obtained from the added processing capability of the new node.

The throughput scalability of one particular implementation of the scaleDB framework has been evaluated using a Redis benchmark utility (not shown). The evaluated scaleDB framework has been configured with 200 connections. For the evaluation, the number of DB partitions has been configured to be equal to the number of DB nodes in the cluster, with no replicas setup. It has been determined that for a single-node cluster with one DB partition, the throughput reaches over 70,000 queries per second (qps). For a two-node cluster with two DB partitions and a similar configuration, using one benchmark client results in a total throughput of 60,000 qps. Obviously, in this configuration the limit of the entire cluster is not reached since only one scaleDB daemon is utilized. When the number of benchmarking clients is increased to four (each node with two clients), the two-node cluster can achieve a total throughput of 125,000 qps, which is about 177% of the maximal throughput achieved on a single-node cluster. In this configuration, the CPUs on both DB nodes are maxed out for handling the data requests. The results of the performance evaluation are shown in Table 2 below:

TABLE 2

ScaleDB performance for single 'SET' operation
(Redis benchmark with 200 concurrent connections)

|  | Port | Bottleneck | Throughput (total) (qps) |
|---|---|---|---|
| 1-node cluster (1 client) | 36001 | scaledbd | 70586.58 |
| 2-node cluster (1 client) | 36001 | scaledbd (single node) | 61728.39 |
| 2-node cluster (4 clients 2 nodes) | 36001 | scaledbd (both nodes) | 125488.88 |

Figure 7:
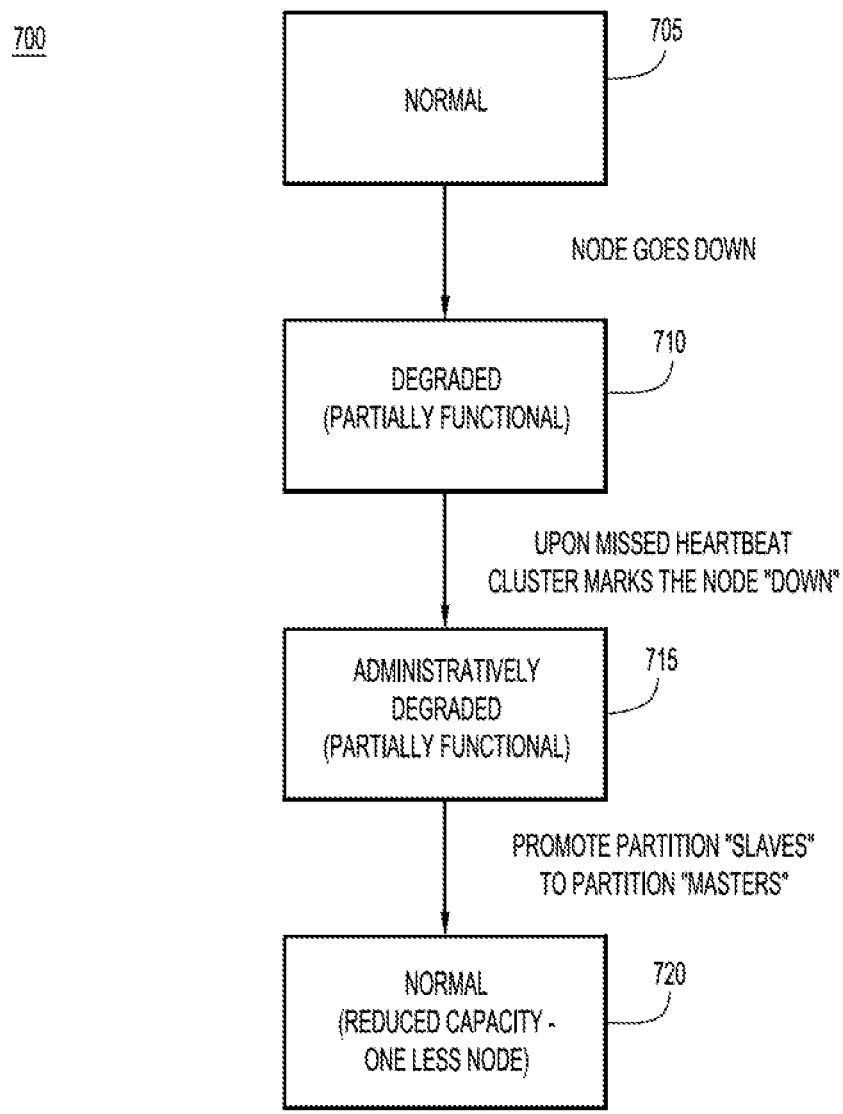
FIG. 7 is a procedural flow chart illustrating operations performed by a scaleDB daemon to recover from a node failure according to an example embodiment of the present invention.

Referring now to FIG. 7 with continued reference to FIGS. 1, 4 and 5. FIG. 7 is a procedural flow chart illustrating operations 700 performed by the scaleDB daemon 180 depicted in FIG. 1 to recover from a node failure. At 705, during normal operation, a DB node such as DB node 515 in FIG. 5 malfunctions. As a result of the node failure of DB node 515 at 705, at 710 the scaleDB framework changes its state to "degraded," i.e., the scaleDB framework is only partially functional. When a heartbeat signal from DB node 515 is not received by the scaleDB administrator tool 425 within a predetermined period of time, DB node 515 is marked as being "down" and at 715 the state of the scaleDB framework is changed to "administratively degraded." In order to recover from the failure of DB node 515, a slave partition that corresponds to the master partition in the failed DB node (e.g., master partition 530) hosted on a different DB node (e.g., DB node 555 in FIG. 5) is promoted to a master partition and at 720 the scaleDB framework returns to normal operation with a reduced capacity with one less DB node).

Figure 8:
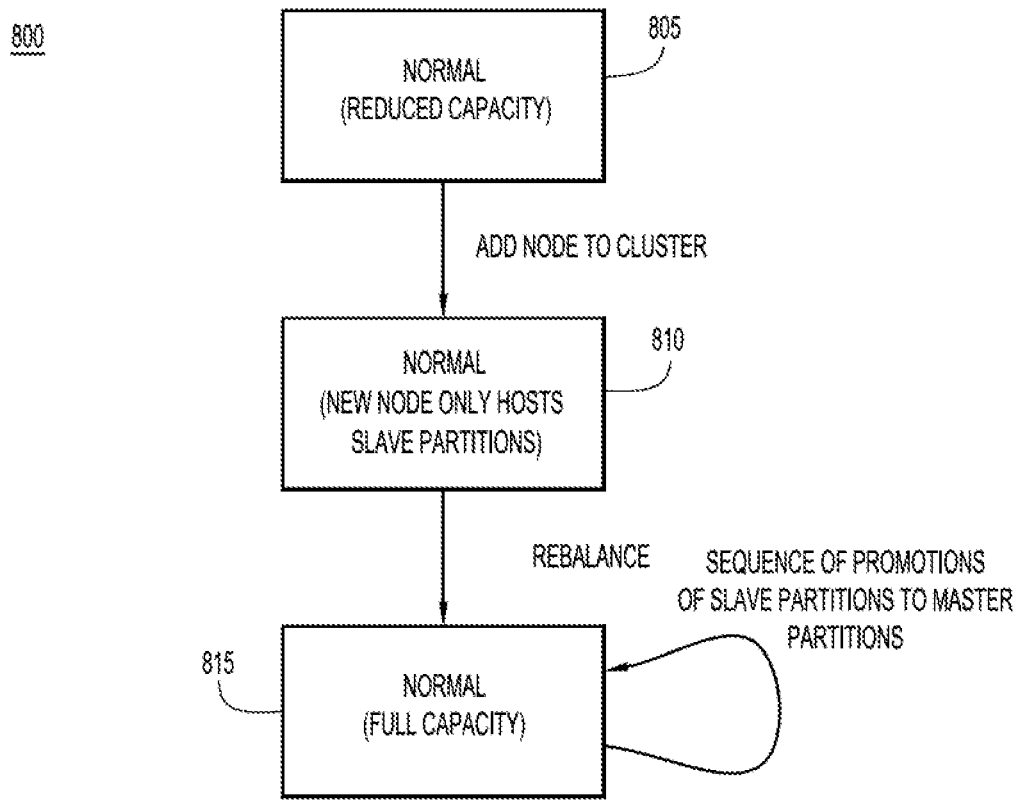
FIG. 8 is a procedural flow chart illustrating operations performed by the scaleDB daemon to add capacity and to rebalance according to an example embodiment of the present invention.

Referring now to FIG. 8 with continued reference to FIGS. 1 and 4-7. FIG. 8 is a procedural flow chart illustrating operations 800 performed by the scaleDB daemon 180 depicted in FIG. 1 to add capacity and rebalance the scaleDB. At 805 (which corresponds to 720 in FIG. 7) the scaleDB framework is in normal state with reduced capacity. In response to an add node command (such as add node command 615 in FIG. 6) at 810 a new node is added which only hosts slave partitions. Thereafter, in response to a rebalance command (such as rebalance command 640 in FIG. 6) slave partitions are promoted to master partitions, the scaleDB framework is rebalanced and at 815, the state is changed to normal state with full capacity.

In summary, scaleDB is a software framework that manages a clustered, distributed NoSQL data store across multiple server or DB nodes. ScaleDB includes daemons running on every DB node, providing auto-sharding and unified data service such that user data can be stored and retrieved consistently from any node. In addition, a scaleDB administrator tool is provided to handle DB cluster life cycle-management, automatic fail-over procedure and auto-scaling functionalities.

As discussed above, the example environment for use with present invention embodiments illustrated in FIG. 1 includes one or more database server systems 130. The database server systems 130 may be remote from each other and communicate over the communication network 170. The communication network may be implemented by any number of any suitable communications media (e.g., wide area network (WAN), local area network (LAN), Internet, Intranet, etc.). Alternatively, database server systems 130 may be local to each other, and communicate via any appropriate local communication medium (e.g., local area network (LAN), hardwire, wireless link, Intranet, etc.).

The memories 120 include NoSQL databases 110. The NoSQL databases 110 may be implemented by any conventional or other database or storage unit, may be local to or remote from database server systems 130, and may communicate via any appropriate communication medium (e.g., local area network (LAN), wide area network (WAN), Internet, hardwire, wireless link, Intranet, etc.). The database server systems 130 may present a graphical user (e.g., GUI, etc.) or other interface (e.g., command line prompts, menu screens, etc.) to solicit information from users pertaining to the configuration of the scaleDB, and may provide reports including analysis results (e.g., configuration information, etc.).

The database server systems 130 may be implemented by any conventional or other computer systems preferably equipped with a display or monitor, a base (e.g., including at least one processor 140, one or more memories 120, one or more storage media 150 and/or internal or external network interfaces or communications devices 160 (e.g., modem, network cards, etc.)), optional input devices (e.g., a keyboard, mouse or other input device), and any commercially available and custom software (e.g., server/communications software, module, browser/interface software, etc.).

Alternatively, one or more database server systems 130 may be operated as a stand-alone unit. In a stand-alone mode of operation, database server system 130 stores or has access to the data (e.g., hash table 190, snapshot 195, etc.), and includes scaleDB daemon 180. The graphical user (e.g., GUI, etc.) or other interface (e.g., command line prompts, menu screens, etc.) solicits information from a corresponding user pertaining to the desired operations, and may provide reports including analysis results.

ScaleDB daemon 180 may include one or more modules or units to perform the various functions of present invention embodiments described below. The various modules may be implemented by any combination of any quantity of software and/or hardware modules or units, and may reside within memory 120 of the database server systems 130 for execution by processor 140.

It will be appreciated that the embodiments described above and illustrated in the drawings represent only a few of the many ways of implementing embodiments for scaling a distributed data store.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., the scaleDB daemon 180) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., the scaleDB daemon 180) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., hash tables 190 or snapshots 195). The database system may be implemented by any number of any conventional or other databases, data stores or storage structures (e.g., files, databases, data structures, data or other repositories, etc.) to store information (e.g., hash tables 190 or snapshots 195). The database system may be included within or coupled to the database server systems 130. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., query results, status of system, etc.).

The present invention embodiments are not limited to the specific tasks or algorithms described above, but may be utilized for. any storage systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A distributed database system comprising:
   a plurality of database nodes;
   one or more distributed databases hosted by the plurality of database nodes, each of the one or more distributed databases comprising a plurality of database partitions, wherein each database partition includes a master database partition and a slave database partition, wherein the master database partition is configured to accept data requests, and wherein the slave database partition is configured to synchronize with the master database partition;
   wherein at least one of the plurality of database nodes is configured to:
      determine usage conditions of the distributed database system and automatically adjust a quantity of the plurality of database nodes in response to the usage conditions indicating an increased amount of memory usage per node, wherein adjusting the quantity includes:
         adding one or more database partitions to the plurality of database partitions hosted by the plurality of database nodes, wherein a quantity of the database partitions exceeds the quantity of database nodes, and wherein at least one database node hosts the master database partitions of two or more different ones of the plurality of database partitions;
         adding one or more database nodes to the plurality of database nodes to increase the quantity of database nodes to at least the quantity of database partitions, wherein the added one or more database nodes increase memory capacity of the distributed database system to accommodate the increased memory usage; and
         rebalancing the master and slave database partitions across the plurality of database nodes with each different master database partition residing on a different database node and each slave database partition residing on a database node different than a database node of a corresponding master database partition.

2. The distributed database system of claim 1, wherein at least one of the plurality of database nodes is configured to maintain a write and read performance of the one or more distributed databases independent from a number of data objects stored in the one or more distributed databases.

3. The distributed database system of claim 1, further comprising an administrator tool configured to perform auto-sharding operations by distributing data records among the master and slave database partitions, wherein each of the data records is identified by a unique key string, and wherein the unique key string is utilized to determine a particular database partition to assign the data records for storage.

4. The distributed database system of claim 1, wherein at least one of the plurality of database nodes is configured to:
   accept data requests and determine which database partition to serve a data request.

5. The distributed database system of claim 4, wherein the database node hosting the determined database partition applies the data request to a master database partition.

6. A method of accessing data in a distributed database system including a plurality of database nodes, said method comprising:
   determining usage conditions of the distributed database system, via at least one of the plurality of database nodes, wherein one or more distributed databases are hosted by the plurality of database nodes, each of the one or more distributed databases comprising a plurality of database partitions, wherein each database partition includes a master database partition and a slave database partition, wherein the master database partition is configured to accept data requests, and wherein the slave database partition is configured to synchronize with the master database partition; and
   automatically adjusting, via at least one of the plurality of database nodes, a quantity of the plurality of database nodes in response to the usage conditions indicating an increased amount of memory usage per node, wherein adjusting the quantity includes:
      adding one or more database partitions to the plurality of database partitions hosted by the plurality of database nodes, wherein a quantity of the database partitions exceeds the quantity of database nodes, and wherein at least one database node hosts the master database partitions of two or more different ones of the plurality of database partitions;
      adding one or more database nodes to the plurality of database nodes to increase the quantity of database nodes to at least the quantity of database partitions, wherein the added one or more database nodes increase memory capacity of the distributed database system to accommodate the increased memory usage; and
      rebalancing the master and slave database partitions across the plurality of database nodes with each different master database partition residing on a different database node and each slave database partition residing on a database node different than a database node of a corresponding master database partition.

7. The method of claim 6, further comprising:
   maintaining a write and read performance of the one or more distributed databases independent from a number of data objects stored in the one or more distributed databases.

8. The method of claim 6, further comprising:
   performing auto-sharding operations by distributing data records among the master and slave database partitions, wherein each of the data records is identified by a unique key string, and wherein the unique key string is utilized to determine a particular database partition to assign the data records for storage.

9. The method of claim 6, further comprising:
   accepting data requests, via at least one of the plurality of database nodes, and determining which database partition to serve a data request.

10. The method of claim 9, further comprising:
    applying the data request to a master database partition via the database node hosting the determined database partition.

11. A computer program product for accessing data in a distributed database system including a plurality of database nodes, said computer program product comprising:

one or more computer readable storage media collectively having computer readable program code embodied therewith, the computer readable program code comprising computer readable program code, that when executed by one or more processors, causes one or more of the plurality of database nodes to:

determine usage conditions of the distributed database system, wherein one or more distributed databases are hosted by the plurality of database nodes, each of the one or more distributed databases comprising a plurality of database partitions, wherein each database partition includes a master database partition and a slave database partition, wherein the master database partition is configured to accept data requests, and wherein the slave database partition is configured to synchronize with the master database partition;

automatically adjust a quantity of the plurality of database nodes in response to the usage conditions indicating an increased amount of memory usage per node, wherein adjusting the quantity includes:

adding one or more database partitions to the plurality of database partitions hosted by the plurality of database nodes, wherein a quantity of the database partitions exceeds the quantity of database nodes, and wherein at least one database node hosts the master database partitions of two or more different ones of the plurality of database partitions;

adding one or more database nodes to the plurality of database nodes to increase the quantity of database nodes to at least the quantity of database partitions, wherein the added one or more database nodes increase memory capacity of the distributed database system to accommodate the increased memory usage; and rebalancing the master and slave database partitions across the plurality of database nodes with each different master database partition residing on a different database node and each slave database partition residing on a database node different than a database node of a corresponding master database partition.

12. The computer program product of claim 11, wherein the computer readable program code further causes one or more of the plurality of database nodes to:

maintain a write and read performance of the one or more distributed databases independent from a number of data objects stored in the one or more distributed databases.

13. The computer program product of claim 11, wherein the computer readable program code further causes one or more of the plurality of database nodes to:

perform auto-sharding operations by distributing data records among the master and slave database partitions, wherein each of the data records is identified by a unique key string, and wherein the unique key string is utilized to determine a particular database partition to assign the data records for storage.

14. The computer program product of claim 11, wherein the computer readable program code further causes one or more of the plurality of database nodes to:

accept data requests and determine which database partition to serve a data request.

15. The computer program product of claim 14, wherein the computer readable program code further causes the database node hosting the determined database partition to:

apply the data request to a master database partition.

\* \* \* \* \*